US007455560B2

(12) United States Patent
Arai et al.

(10) Patent No.: US 7,455,560 B2
(45) Date of Patent: Nov. 25, 2008

(54) OUTBOARD MOTOR HAVING A COWLING

(75) Inventors: Hideto Arai, Shizuoka-ken (JP); Yu Ito, Shizuoka-ken (JP)

(73) Assignee: Yamaha marine Kabushiki Kaisha, Shizuoka-ken (JP)

( * ) Notice: Subject to any disclaimer, the term of this patent is extended or adjusted under 35 U.S.C. 154(b) by 0 days.

(21) Appl. No.: 11/756,556

(22) Filed: May 31, 2007

(65) Prior Publication Data
US 2007/0293105 A1    Dec. 20, 2007

(30) Foreign Application Priority Data
Jun. 16, 2006    (JP) ............................... 2006-167945

(51) Int. Cl.
B63H 20/32    (2006.01)
(52) U.S. Cl. .................................................... 440/77

(58) Field of Classification Search ..................... 440/77
See application file for complete search history.

(56) References Cited
U.S. PATENT DOCUMENTS
5,928,043 A * 7/1999 Rinzaki ........................ 440/77
6,488,552 B2 * 12/2002 Kitsu et al. ................... 440/77

FOREIGN PATENT DOCUMENTS
JP    11-034984    2/1999

* cited by examiner

Primary Examiner—Jesús D Sotelo
(74) Attorney, Agent, or Firm—Knobbe, Martens, Olson & Bear, LLP

(57) ABSTRACT

An outboard motor has a cowling enclosing the engine. A sidewall of the cowling has an air introduction opening for introducing ambient air to an air introduction chamber within the cowling. A protruded suction opening of an air duct in the air introduction opening has a flange extending generally toward the air introduction opening so as to deflect water from the opening.

17 Claims, 8 Drawing Sheets

[FIG. 1]
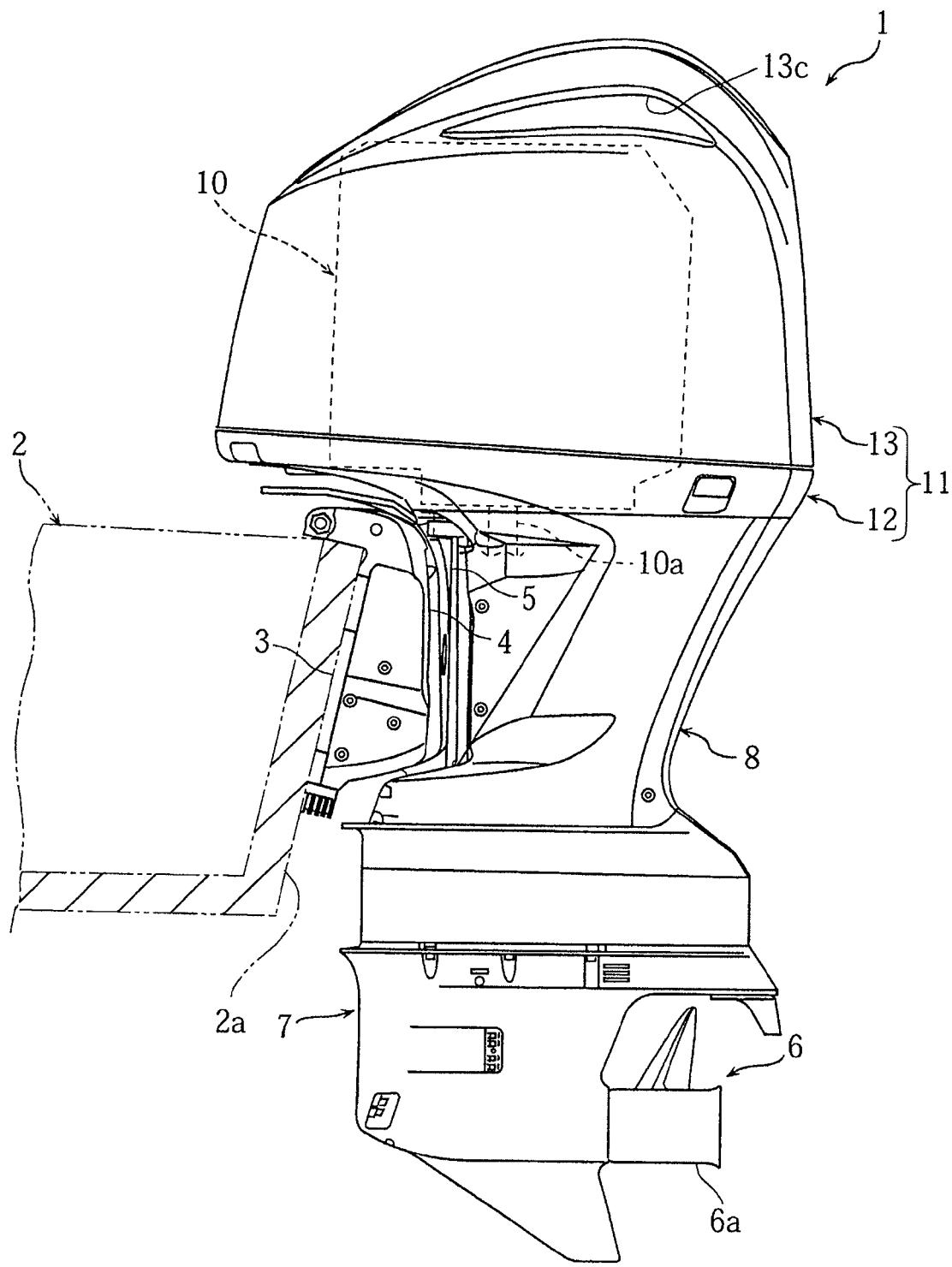

[FIG. 2]
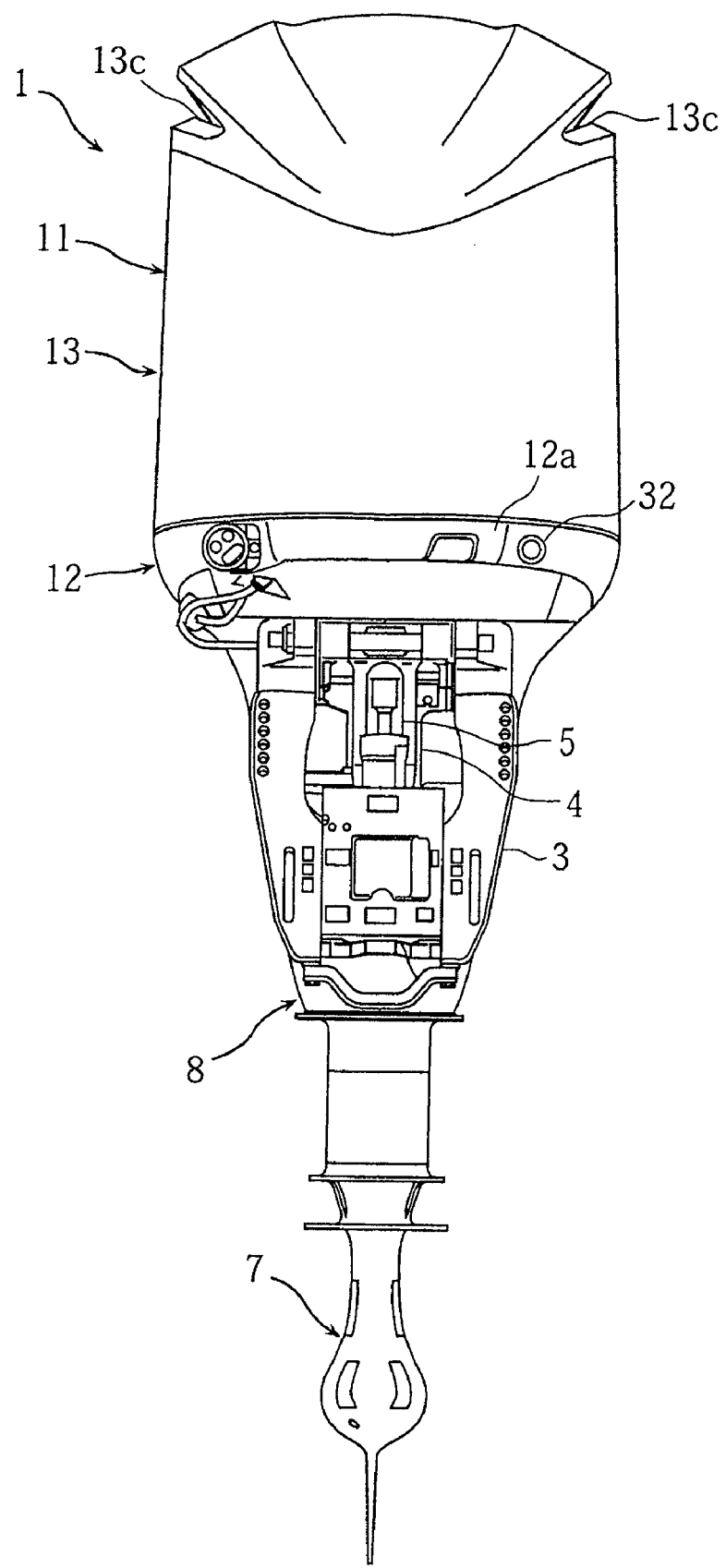

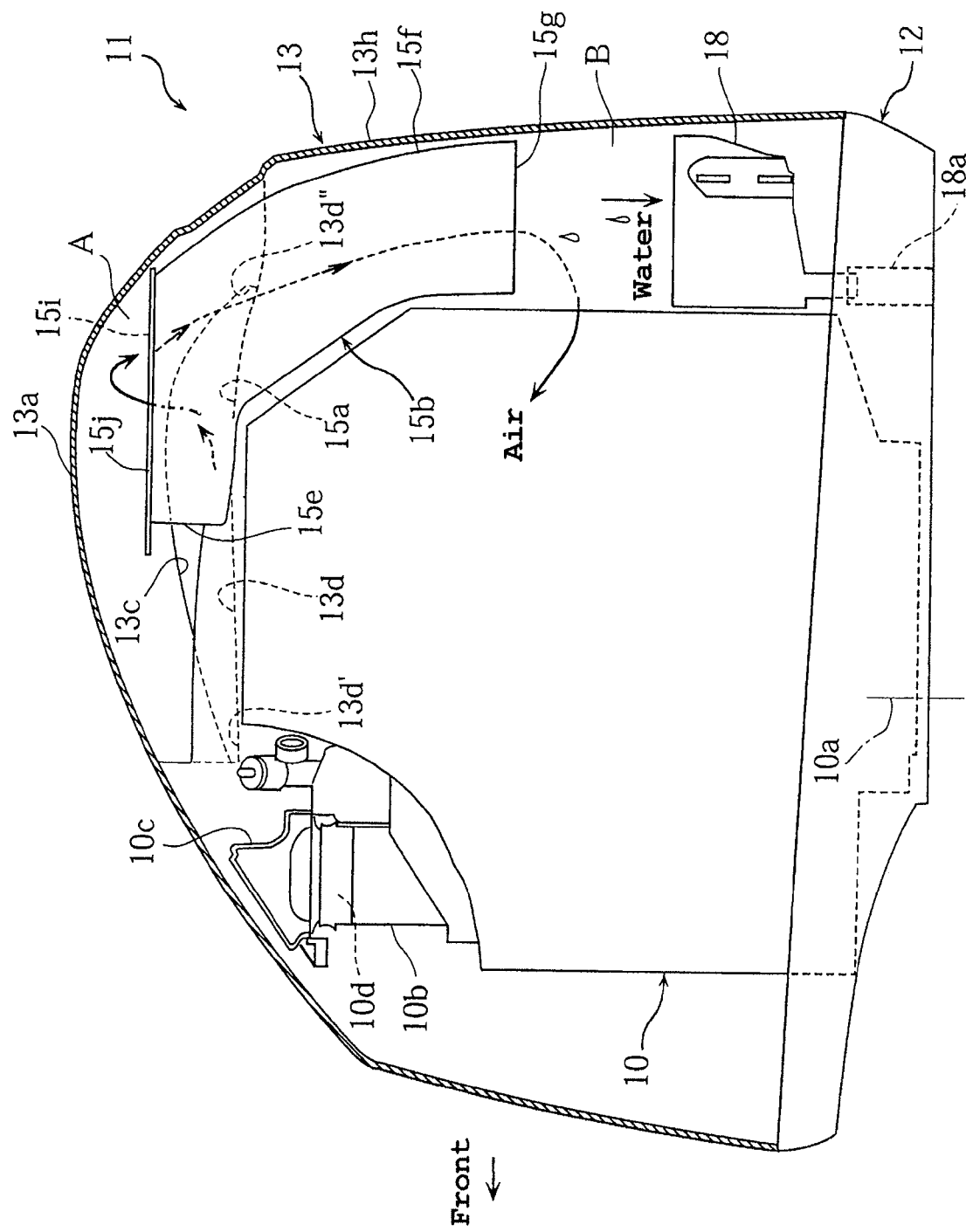
[FIG. 3]

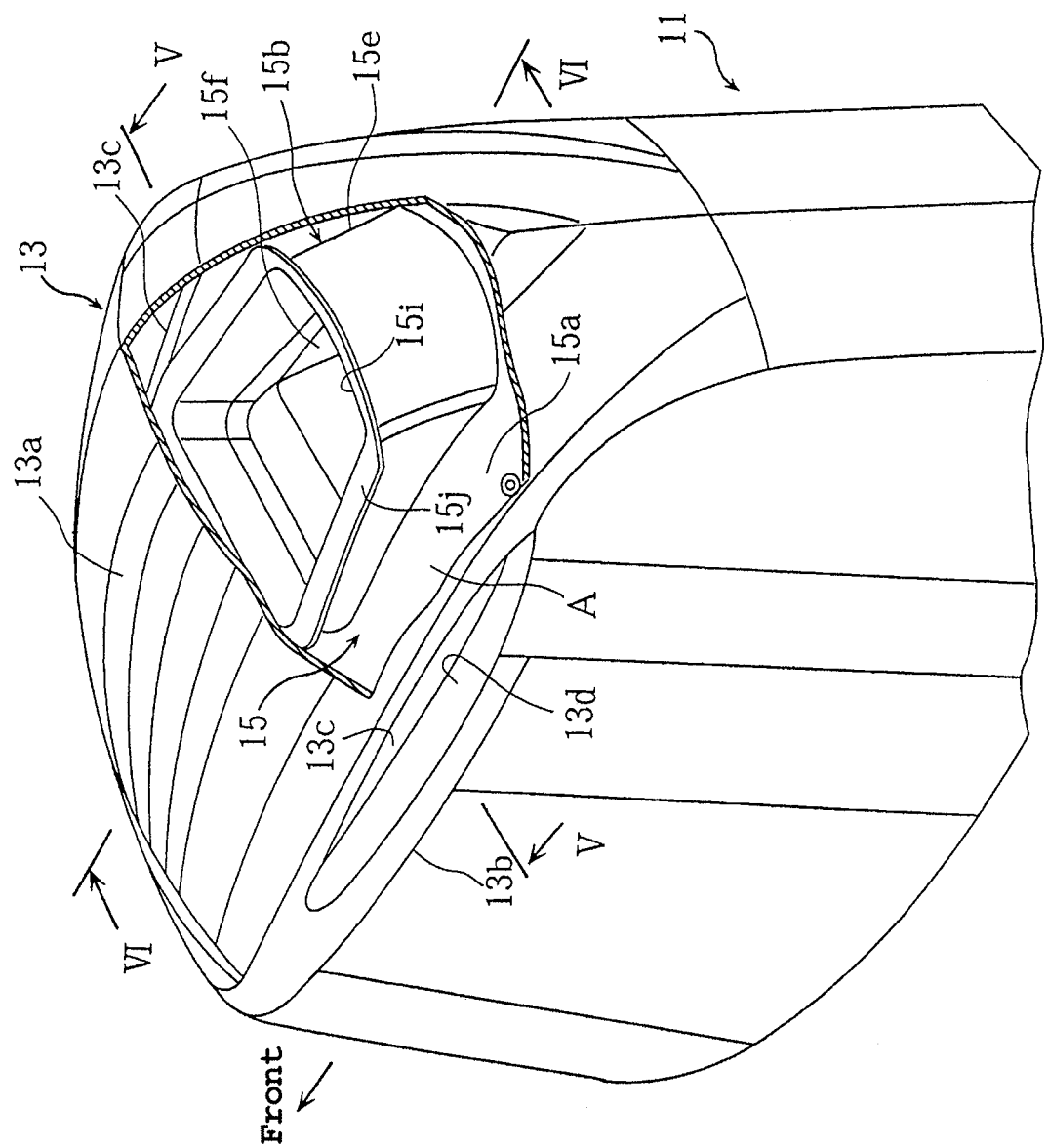
[FIG. 4]

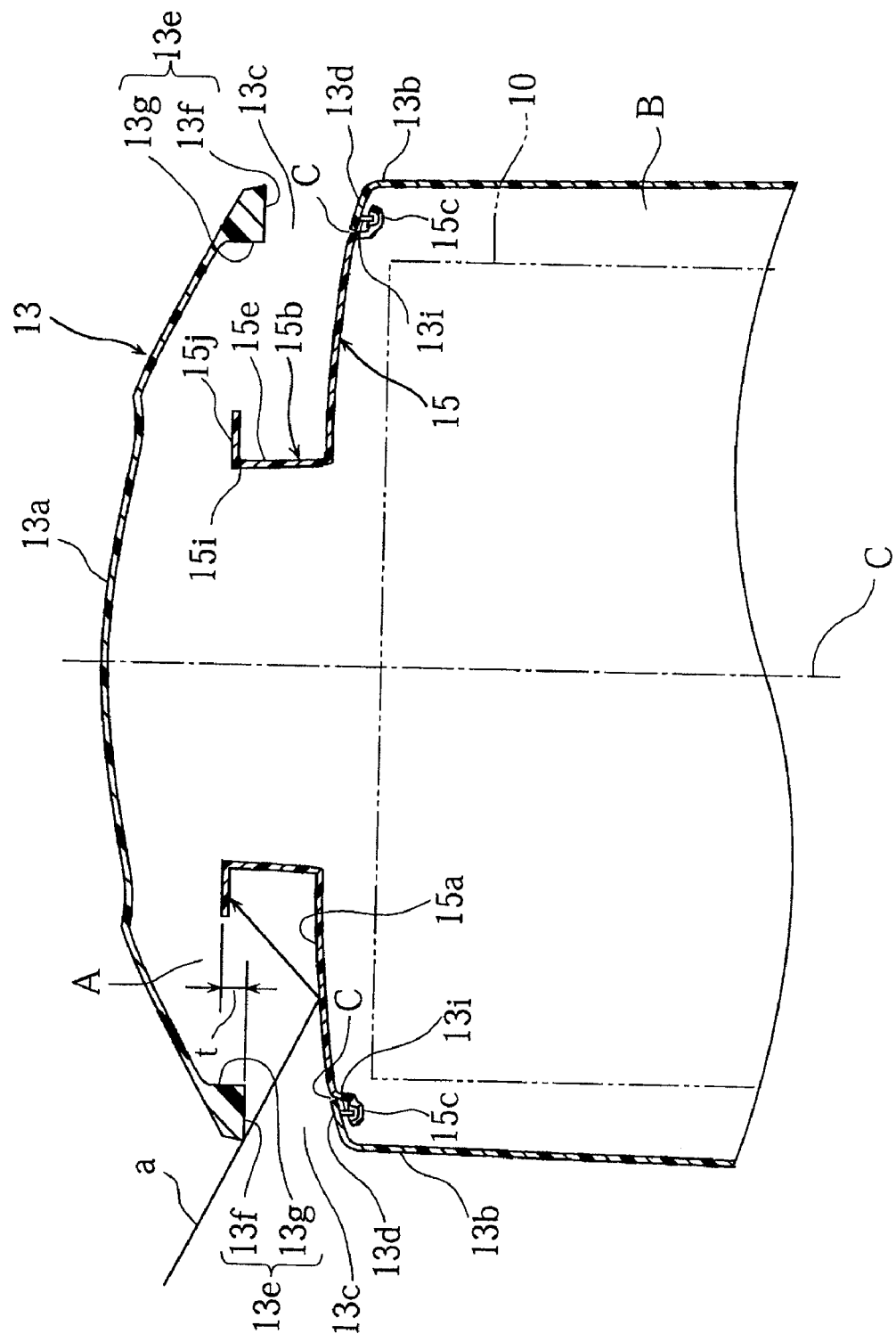
[FIG. 5]

[FIG. 6]
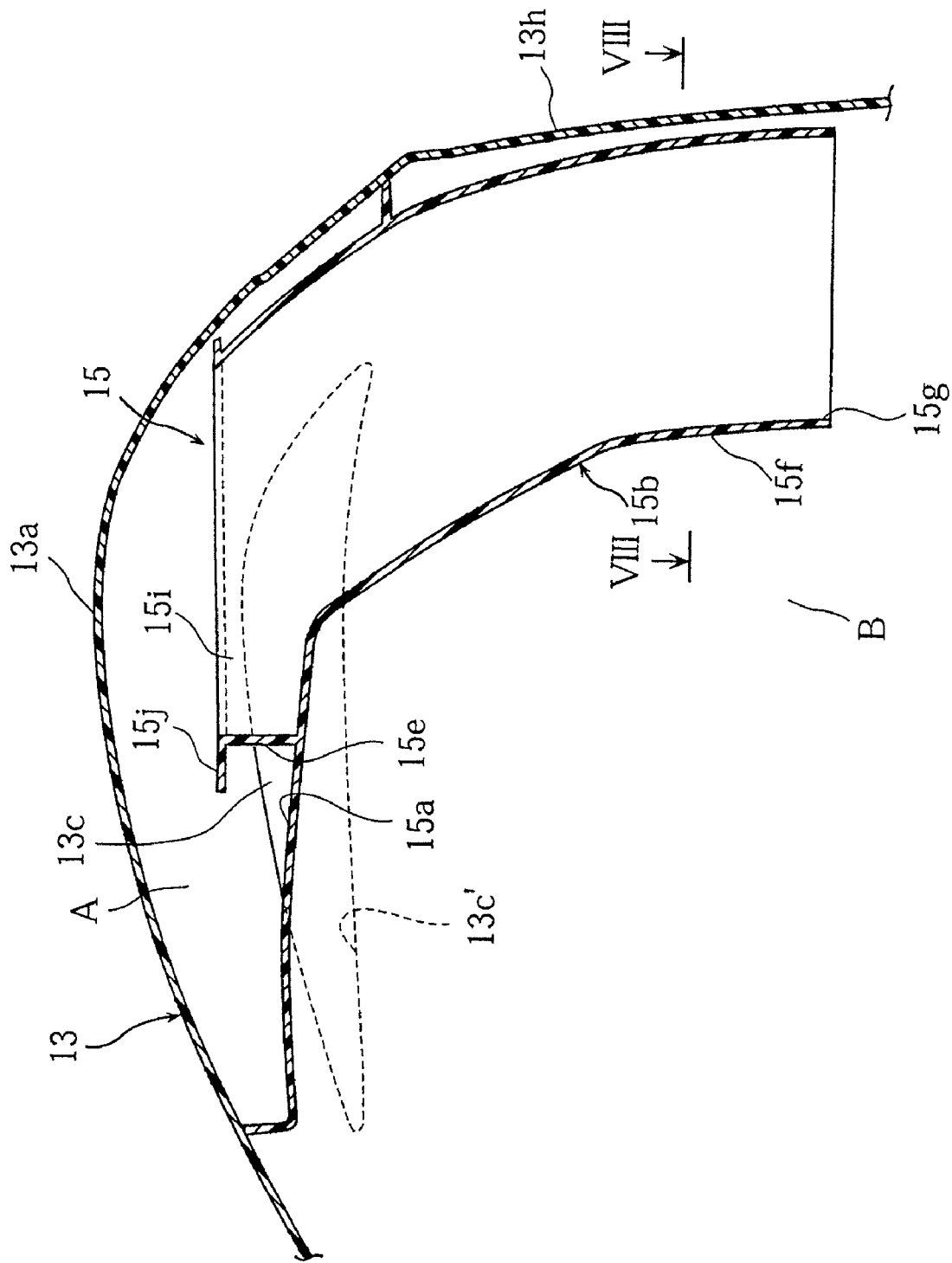

[FIG. 7]
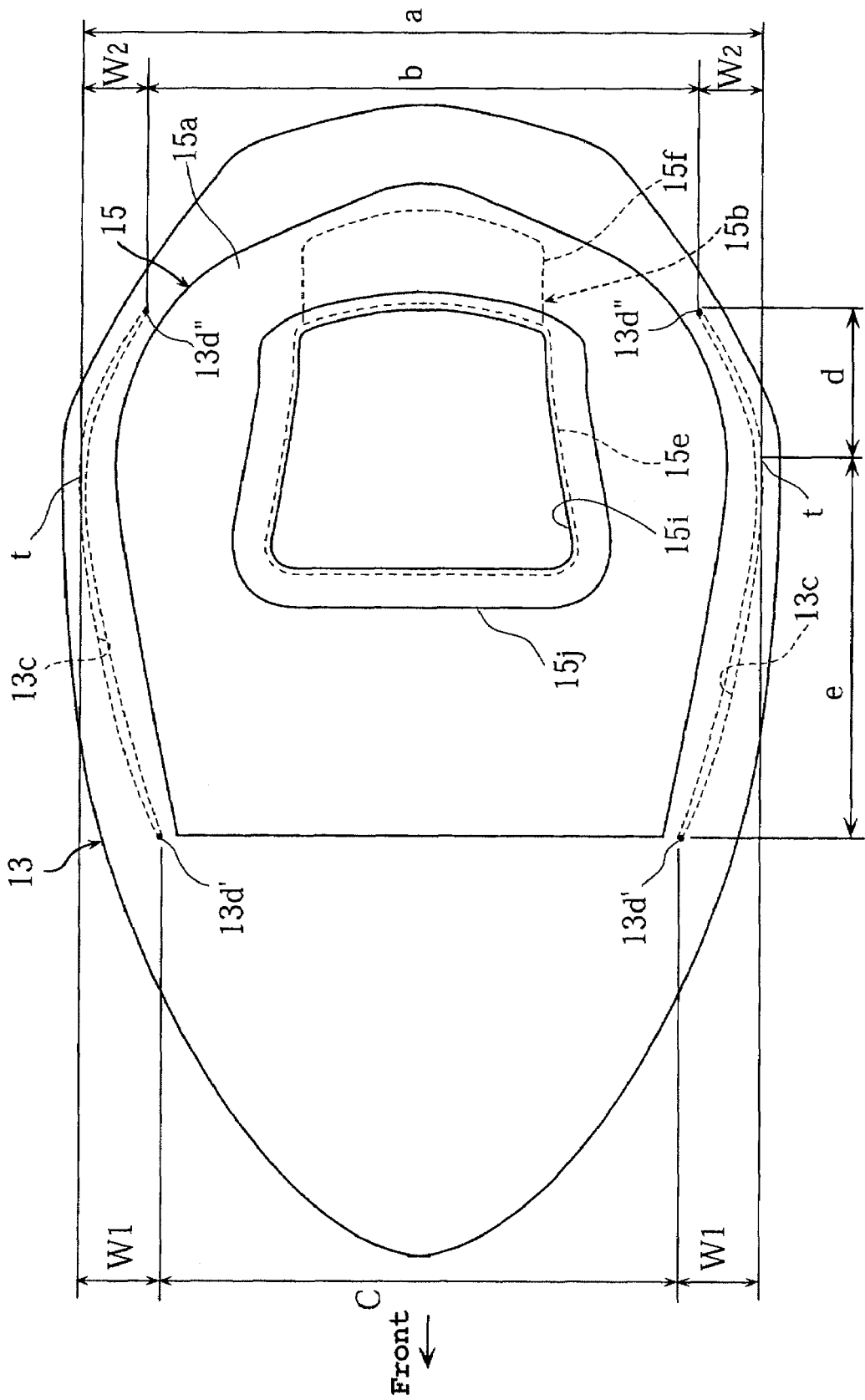

[FIG. 8]
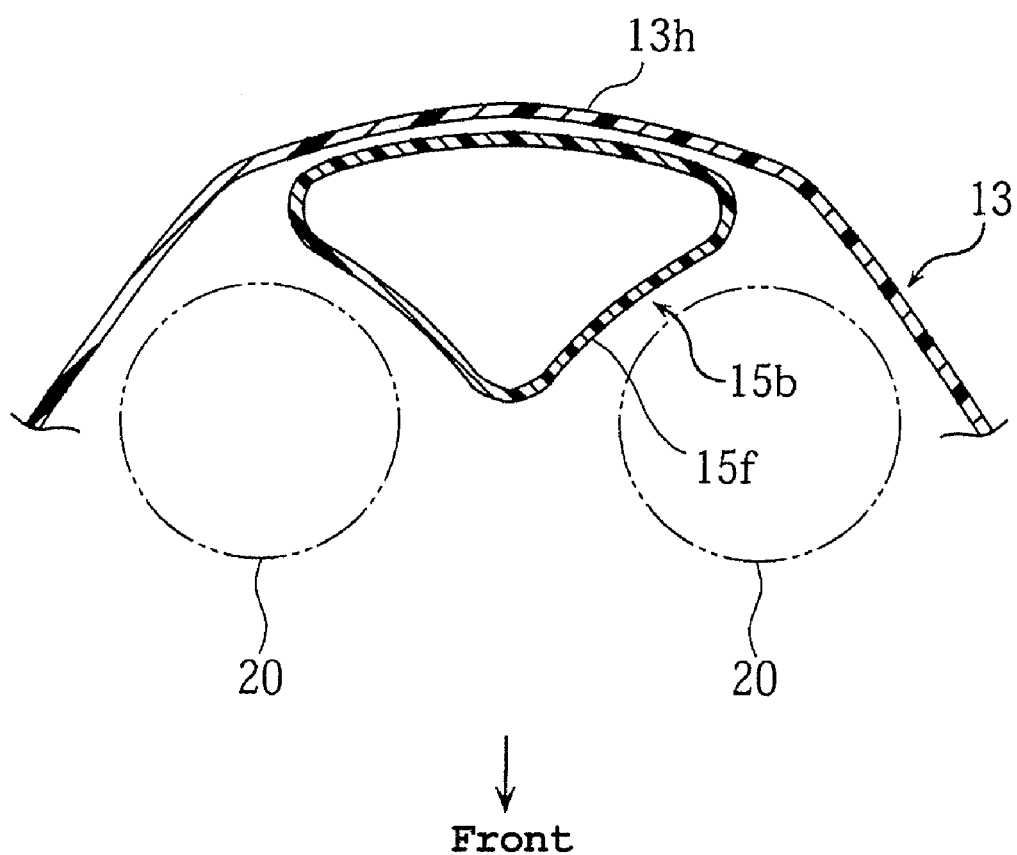

OUTBOARD MOTOR HAVING A COWLING

CROSS-REFERENCE TO RELATED APPLICATIONS

The present application is based on and claims priority under 35 U.S.C. §119 to Japanese Patent Application Serial No. 2006-167945, filed on Jun. 16, 2006, the entire contents of which are expressly incorporated by reference herein.

BACKGROUND

1. Field of the Invention

The present invention relates to an outboard motor including a cowling surrounding an engine, and more particularly to an outboard motor having a cowling defining an air introduction chamber.

2. Description of the Related Art

In outboard motors for use at the stern of a hull, ambient water tends to enter the cowling surrounding an engine as ambient air is introduced to the cowling. This problem results from the inherent structure of the outboard motors. The outboard motors, therefore, usually employ a structure for separating water droplets from the air introduced to the cowling. The air separated from the water droplets will be delivered to the engine.

In the outboard motor disclosed in Japanese Patent Publication No. 11-034984, an air introduction chamber above an engine and an engine chamber are defined in the cowling. A rear wall of the cowling has an air introduction opening. A pair of air ducts extend into the air introduction chamber for guiding the ambient air introduced to the air introduction chamber to the engine chamber. In the outboard motor structured as above, the ambient air introduced from the air introduction opening will flow and circulate around the air ducts, and water droplets will be separated from the air before entering the engine chamber.

SUMMARY

Applicants have noted that, in the conventional outboard motor described above, ambient water entering from the air introduction opening may be trapped in the air introduction chamber. The trapped water may be splashed from the bottom of the molding and sucked into the engine chamber through the air duct.

In outboard motors with an air introduction opening in the rear wall of the cowling, entry of ambient water into the cowling during forward driving can be avoided. However, during reverse driving or abrupt deceleration, the outboard motor may encounter the swell of a wave, resulting in a large amount of water flowing into the cowling.

Accordingly, there is a need in the art for an outboard motor in which water that impinged on the bottom of the molding is avoided from being sucked into the engine chamber, entry of water into the cowling during forward driving is limited, and entry of water into the cowling when the outboard motor encounters the swell of a wave during reverse driving or abrupt deceleration is limited.

In one embodiment, an air duct is formed on a molding to protrude toward an air introduction chamber. The fringe of a protruded side opening of the air duct has a flange extending toward the air introduction opening. As a result, even if ambient water entering from the air introduction opening is trapped in the air introduction chamber and splashed from the bottom of the molding, the water will impinge on the flange to be reflected. Thus, the amount of water that will be sucked into the engine chamber can be limited.

In a preferred embodiment, an air introduction opening is formed through a sidewall of the cowling. As a result, entry of water into the cowling during forward driving is limited. Even if the outboard motor encounters a wave during reverse driving or abrupt deceleration, direct entry of water into the cowling is limited.

In accordance with a preferred embodiment, the present invention provides an outboard motor comprising an engine and a cowling generally enclosing the engine. The cowling has generally opposed side walls and an interior space divided into an engine chamber and an air introduction chamber. An air introduction opening is formed through at least one of the side walls for introducing ambient air to the air introduction chamber. The air introduction chamber has a bottom wall and an air duct extending through the bottom wall so as to communicate air from the air introduction chamber to the engine chamber. A protruding portion of the air duct extends generally upwardly from the bottom wall and terminates at an opening. The air duct protruding portion has a flange extending therefrom in a direction generally away from the air duct opening.

In another embodiment the air introduction opening has an upper end, and the flange is positioned vertically higher than the air introduction opening upper end. In a further embodiment, the upper end of the air introduction opening comprises a horizontal side extending generally horizontally from an outer end of the air introduction opening toward the inside thereof, and a vertical side extending generally vertically upward from an inner end of the horizontal side. In a yet further embodiment, the air duct has an upper edge at the opening, and the flange extends from the upper edge.

In yet another embodiment, the air duct is spaced from the air introduction opening. In one such embodiment, the bottom wall is downwardly inclined from the air duct to the air introduction opening. In another such embodiment, the air introduction chamber is defined by a molding disposed in the interior space of the cowling. In still another such embodiment, the flange is directed generally toward the air introduction opening. In further embodiments, the flange is provided about the circumference of the opening.

In still further embodiments, an air introduction opening is provided through each of the opposing side walls of the cowling, and the air duct is positioned generally centered between the opposing air introduction openings.

In a yet further embodiment, the air introduction opening has an upper end, and the flange is positioned vertically higher than the air introduction opening upper end.

BRIEF DESCRIPTION OF THE DRAWINGS

FIG. 1 is a side view of an outboard motor mounted at the stern of a hull in accordance with an embodiment of the present invention.

FIG. 2 is a front view of the outboard motor shown in FIG. 1.

FIG. 3 is a sectional side view of a cowling surrounding an engine of the outboard motor shown in FIG. 1.

FIG. 4 is a perspective view of the cowling shown in FIG. 3.

FIG. 5 is a cross sectional view of the cowling shown in FIG. 4 (cross sectional view taken along the line V-V in FIG. 4).

FIG. 6 is a sectional view of the cowling shown in FIG. 4 (sectional view taken along the line VI-VI in FIG. 4).

FIG. 7 is a plan view of a molding disposed in the cowling shown in FIG. 4.

FIG. 8 is a cross sectional view of a lower duct of the molding shown in FIG. 7 (cross sectional view taken along the line VIII-VIII in FIG. 6).

DETAILED DESCRIPTION OF PREFERRED EMBODIMENTS

FIGS. 1 to 8 are intended to explain an outboard motor configured in accordance with some embodiments. FIG. 1 is a side view of an outboard motor; FIG. 2 is a front view of the outboard motor shown in FIG. 1; FIG. 3 is a sectional side view of a cowling surrounding an engine of the outboard motor shown in FIG. 1; FIG. 4 is a perspective view of the cowling shown in FIG. 3; FIG. 5 is a cross sectional view of the cowling shown in FIG. 4 (cross sectional view taken along the line V-V in FIG. 4); FIG. 6 is a sectional view of the cowling shown in FIG. 4 (sectional view taken along the line VI-VI in FIG. 4); FIG. 7 is a plan view of a molding; and FIG. 8 is a cross sectional view of the molding shown in FIG. 7 (cross sectional view taken along the line VIII-VIII in FIG. 6). The terms "right," "left," "front" and "rear" as used herein refer to right, left, front and rear as viewed from the side of the hull. It is to be understood that variations of the illustrated embodiments, such as different engine configurations and types, can be used while still employing inventive principles.

In the figures, an outboard motor 1 is mounted at the stern 2a of a hull 2. The outboard motor 1 includes a clamp bracket 3 having a swivel arm 4 and a pivot shaft 5 and secured to the stern 2a. The outboard motor 1 is supported by the clamp bracket 3 in a manner to pivot upward and downward via the swivel arm 4 and to turn to the right and left about the pivot shaft 5.

The external structure of the outboard motor 1 is generally composed of a lower casing 7, an upper casing 8 coupled to the top of the lower casing 7, and a cowling 11. The lower casing 7 surrounds a propulsion unit 6 with a propeller 6a. On the top of the upper casing 8, an engine 10 is mounted. The cowling 11 surrounds the engine 10.

The engine 10 preferably is vertically disposed such that the crankshaft 10a extends generally vertically during cruising. The crankshaft 10a drives the propeller 6a of the propulsion unit 6 to produce propulsion force.

A throttle body 10b is positioned at the upper front end of the engine 10 and communicates with an inlet port (not shown). A silencer 10c is inserted into an air intake 10d of the throttle body 10b to be fixed.

The cowling 11 preferably is composed of a bottom cowl 12 surrounding the bottom of the engine 10 and a top cowl 13 releasably coupled to the bottom cowl 12 and surrounding an upper portion of the engine 10. Removing the top cowl 13 will expose the engine 10, allowing the user to perform maintenance of the engine 10.

In the cowling 11, a molding 15 is disposed to define an air introduction chamber A and an engine chamber B.

More specifically, the molding 15 is disposed above the engine 10 in the top cowl 13 and inside of a top wall 13a of the top cowling 13. The air introduction chamber A is defined by the topside of the molding 15 and the top wall 13a of the top cowl 13. The engine chamber B is defined below the molding 15.

In the illustrated embodiment, left and right sidewalls 13b, 13b defining the transverse sides of the top cowl 13 each have an air introduction opening 13c, 13c. Each air introduction opening 13c preferably has a wing-like configuration when viewed transversely thereof.

The left and right air introduction openings 13c preferably are positioned at the upper end of the top cowl 13 and communicate with the air introduction chamber A. More specifically, when viewed in a direction transversely of the cowling, each air introduction opening 13c has a lower end 13d, a front end 13d' and a rear end 13d". The lower end 13d is positioned above the upper end of the engine 10. The front end 13d' is positioned forwardly from the crankshaft 10a. The rear end 13d" is at generally the same transverse position as a rear end of a suction opening 15i of an air duct 15b, which will be described in greater detail below.

When viewed in a plan view, the air introduction opening 13c of the illustrated embodiment protrudes outwardly as shown in FIG. 7. Assuming the distance between respective outermost ends "t" of the left and right air introduction openings 13c as "a", the distance between the rear ends 13d" as "b", the distance between the front ends 13d' as "c", the length from one of the outermost ends "t" to the associated rear end 13d" as "d", and the length from one of the outermost ends "t" to the associated front end 13d' as "e", the distance "a">the distance "b", the distance "b">the distance "c", and the length "e">the length "d".

Accordingly, a portion of the cowling forward from the outermost ends "t" of the air introduction openings 13c has a transverse width W1 and a longitudinal length "e" greater than a portion rearward from the outermost ends "t". As a result, ambient air will be easily sucked into the cowling from the front side thereof during cruising. The portion of the cowling rearward from the outermost ends "t" of the air introduction openings 13c has a transverse width W2 and a longitudinal length "d" smaller than the portion forward from the outermost ends "t". As a result, even if the outboard motor 1 encounters a wave from the rear while the watercraft is standing, only a limited amount of ambient water will enter the cowling and will then drain smoothly from the front side thereof.

The lower end 13d of the air introduction opening 13c preferably is folded to the inside. In one preferred embodiment, the upper end 13e of the air introduction opening 13c has a large transverse and vertical thickness. The upper end 13e and the lower end 13d define a space extending to the inside.

The upper end 13e of the air introduction opening 13c has a horizontal side 13f and a vertical side 13g. The horizontal side 13f extends generally horizontally from the outer end of the air introduction opening 13c to the inside thereof. The vertical side 13g extends generally vertically upward from the inner end of the horizontal side 13f.

The molding 15 preferably includes a boundary wall 15a and an air duct 15b. The boundary wall 15a is attached to the inside of the top wall 13a of the top cowl 13 and preferably is inclined downwardly toward the left and right air introduction openings 13c. The air duct 15b is formed on and through the boundary wall 15a and guides ambient air introduced to the air introduction chamber A to the engine chamber B. The outer surface of the boundary wall 15a is flush with the outer surface of the lower end 13d of the air introduction opening 13c.

As shown in FIG. 5, the fringe of the boundary wall 15a preferably is folded to form a seal groove 15c below a gap "g" between the boundary wall 15a and the lower end 13d of the air introduction opening 13c. The left and right seal grooves 15c preferably are filled with a sealant and receive respective seal lugs 13i formed on the associated lower ends 13d. With such structure, the ambient water that entered the air introduction chamber A will be forced along the boundary wall 15a of the molding 15 toward the air introduction openings 13c and then to the outside of the top cowl 13. Such water is prevented from leaking through the gap "g" into the engine chamber B.

The air duct 15b preferably is composed of an upper duct portion 15e and a lower duct portion 15f. The upper duct 15e protrudes from the boundary wall 15a into the air introduction chamber A. The lower duct 15f is formed with the rear of the upper duct 15e and extends from the boundary wall 15a into the engine chamber B.

The lower duct 15f is positioned behind the engine 10 and extends downwardly along a rear wall 13h of the top cowl 13. The lower duct 15f has a discharge port 15g that is open at its lower end. In the illustrated embodiment, the discharge port 15g is positioned in the vertical middle of the engine 10. The discharge port 15g is thus located lower than the air intake 10d of the throttle body 10b. In other embodiments, the discharge port 15g can be positioned vertically lower or higher than in the illustrated embodiment.

The lower duct 15f has a generally triangular shape as shown in a cross sectional view of FIG. 8. The lower duct is positioned such that one of its corners is positioned between left and right exhaust pipes 20, 20, thereby avoiding interference therewith.

In the cowling 11, a barrel-shaped water collecting section 18 is disposed below the discharge port 15g of the lower duct 15f. The water collecting section 18 communicates with the outside through the bottom of the bottom cowl 12. Thus, water that has entered the air duct 15b will drip down from the discharge port 15g, collect in the water collecting section 18 and finally drain through a drain passage 18a of the bottom cowl 12.

The upper duct 15e preferably is spaced apart from the left and right air introduction openings 13c. More specifically, the upper duct 15e is positioned in a transversely central portion of the top cowl 13. The centerline of the upper duct 15e preferably is aligned with the centerline CL of the outboard motor 1.

The suction opening 15i (protruded side opening) of the upper duct 15e is arranged generally opposed to the top wall 13a of the top cowl 13 with a space therebetween.

The fringe of the suction opening 15i preferably has a flange 15j extending toward the left and right air introduction openings 13c. More preferably, the flange 15j surrounds the entire fringe of the suction opening 15i and extends outwardly in the direction generally perpendicular to the direction in which ambient air will be sucked into the suction opening 15i (in the direction of the centerline CL). In other embodiments, the flange 15j can have other shapes, such as curved or the like, so as to direct flowing water away from the opening 15i.

The flange 15j preferably is positioned higher than the horizontal sides 13f of the upper ends 13e of the left and right air introduction openings 13c by the distance "h", when viewed transversely of the cowling.

The ambient air introduced to the air introduction chamber A from the left and right air introduction openings 13c of the top cowl 13 will create a swirling flow in the air introduction chamber A and circulate around the upper duct 15e and the flange 15j. This causes water droplets to be separated from the air, and the water droplets will be forced along the boundary wall 15a of the molding 15 toward the air introduction openings 13c and to the outside of the top cowl 13.

The air separated from the water droplets will be sucked into the upper duct 15e, flow through the lower duct 15f into the engine chamber B and then be sucked by the engine 10.

In accordance with the illustrated embodiment, the molding 15, which defines the air introduction chamber A and the engine chamber B in the top cowl 13, has the upper duct 15e protruding into the air introduction chamber A. The fringe of the suction opening 15i of the upper duct 15e has the flange 15j extending toward the air introduction openings 13c. As a result, even if ambient splashing or flowing water "w" (see FIG. 5) entering from the air introduction opening 13c impinges on the boundary wall 15a of the molding 15, most of such water will in turn impinge on the flange 15j to be reflected. Thus, the amount of water that will be sucked into the engine chamber B through the air duct 15 can be limited.

In accordance with this embodiment, the left and right sidewalls 13b, which define the transverse sides of the top cowl 13, have the longitudinal air introduction openings 13c. As a result, entry of ambient water into the air introduction chamber A during advancing can be limited. Even if the outboard motor encounters a wave during reverse driving or abrupt deceleration, direct entry of ambient water into the air introduction chamber A can be limited.

In accordance with this embodiment, the left and right sidewalls 13b of the top cowl 13 have the air introduction openings 13c. The air duct 15b is positioned in the transversely central portion of the top cowl 13. As a result, the air duct 15b can be positioned apart from the left and right air introduction openings 13c. The sufficient amount of ambient air can be introduced to the cowling from the left and right air introduction openings 13c. The amount of water that will directly enter the cowling from the left and right air introduction openings 13c and reach the air duct 15b can be limited.

In accordance with one embodiment, the flange 15j of the air duct 15b is positioned higher than the upper ends 13e of the left and right air introduction openings 13c by the distance "h". As a result, the water that impinged on the boundary wall 15a of the molding 15 can be prevented from being sucked into the air duct 15b.

In accordance with one embodiment, the upper end 13e of the air introduction opening 13c has the horizontal side 13f, extending generally horizontally from the outer end of the air introduction opening 13c toward the inside thereof, and the vertical side 13g, extending generally vertically upward from the inner end of the horizontal side 13f. As a result, most of the water droplets that entered from the outside of the top wall 13a of the top cowl 13 along the horizontal side 13f will drip down from the corner of the vertical side 13g to drain from the top cowl 13. Thus, the amount of water droplets that will enter the cowling along the inside of the top cowl 13 and be sucked into the air duct 15b is limited.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. It is also contemplated that various combinations or subcombinations of the specific features and aspects of the embodiments may be made and still fall within the scope of the invention. Accordingly, it should be understood that various features and aspects of the disclosed embodiments can be combined with or substituted for one another in order to form varying modes of the disclosed invention. Thus, it is intended that the scope of the present invention herein disclosed should not be limited by the particular disclosed embodiments described above, but should be determined only by a fair reading of the claims that follow.

What is claimed is:

1. An outboard motor comprising an engine and a cowling generally enclosing the engine, the cowling having generally opposed side walls and an interior space divided into an engine chamber and an air introduction chamber, an air introduction opening formed through at least one of the side walls for introducing ambient air to the air introduction chamber, the air introduction chamber having a bottom wall and an air duct extending through the bottom wall so as to communicate air from the air introduction chamber to the engine chamber, a protruding portion of the air duct extending generally upwardly from the bottom wall and terminating at an opening, the air duct protruding portion having a flange extending therefrom in a direction generally away from the air duct opening, wherein the flange is provided about the circumference of the opening.

2. An outboard motor as in claim 1, wherein the air introduction opening has an upper end, and the flange is positioned vertically higher than the air introduction opening upper end.

3. An outboard motor as in claim 2, wherein the upper end of the air introduction opening comprises a horizontal side extending generally horizontally from an outer end of the air introduction opening toward the inside thereof, and a vertical side extending generally vertically upward from an inner end of the horizontal side.

4. An outboard motor as in claim 2, wherein the air duct has an upper edge at the opening, and the flange extends from the upper edge.

5. An outboard motor as in claim 1, wherein the air duct is spaced from the air introduction opening.

6. An outboard motor as in claim 5, wherein the bottom wall is downwardly inclined from the air duct to the air introduction opening.

7. An outboard motor as in claim 6, wherein the air introduction chamber is defined by a molding disposed in the interior space of the cowling.

8. An outboard motor as in claim 5, wherein the flange is directed generally toward the air introduction opening.

9. An outboard motor as in claim 1, wherein an air introduction opening is provided through each of the opposing side walls of the cowling, and the air duct is positioned generally centered between the opposing air introduction openings.

10. An outboard motor comprising an engine and a cowling generally enclosing the engine, the cowling having generally opposed side walls and an interior space divided into an engine chamber and an air introduction chamber, an air introduction opening formed through at least one of the side walls for introducing ambient air to the air introduction chamber, the air introduction chamber having a bottom wall and an air duct extending through the bottom wall so as to communicate air from the air introduction chamber to the engine chamber, a protruding portion of the air duct extending generally upwardly from the bottom wall and terminating at an opening, the air duct protruding portion having a flange extending therefrom in a direction generally away from the air duct opening, wherein an air introduction opening is provided through each of the opposing side walls of the cowling, and the air duct is positioned generally centered between the opposing air introduction openings.

11. An outboard motor as in claim 10, wherein the flange is provided substantially about the circumference of the air duct opening.

12. An outboard motor as in claim 10, wherein the air introduction opening has an upper end, and the flange is positioned vertically higher than the air introduction opening upper end.

13. An outboard motor as in claim 10, wherein the air duct is spaced from the air introduction opening.

14. An outboard motor as in claim 12, wherein the flange is provided about the circumference of the opening.

15. An outboard motor comprising an engine and a cowling generally enclosing the engine, the cowling having generally opposed side walls and an interior space divided into an engine chamber and an air introduction chamber, an air introduction opening formed through at least one of the side walls for introducing ambient air to the air introduction chamber, the air introduction chamber having a bottom wall and an air duct extending through the bottom wall so as to communicate air from the air introduction chamber to the engine chamber, a protruding portion of the air duct extending generally upwardly from the bottom wall and terminating at an opening, the air duct protruding portion having a flange extending therefrom in a direction generally away from the air duct opening, wherein the air introduction opening has an upper end, and the flange is positioned vertically higher than the air introduction opening upper end.

16. An outboard motor as in claim 15, wherein the upper end of the air introduction opening comprises a horizontal side extending generally horizontally from an outer end of the air introduction opening toward the inside thereof, and a vertical side extending generally vertically upward from an inner end of the horizontal side.

17. An outboard motor as in claim 15, wherein the air duct has an upper edge at the opening, and the flange extends from the upper edge.

* * * * *